United States Patent
Liang et al.

(10) Patent No.: US 10,264,469 B2
(45) Date of Patent: Apr. 16, 2019

(54) ROBUST COVERAGE METHOD FOR RELAY NODES IN DOUBLE-LAYER STRUCTURE WIRELESS SENSOR NETWORK

(71) Applicant: SHENYANG INSTITUTE OF AUTOMATION, CHINESE ACADEMY OF SCIENCES, Liaoning (CN)

(72) Inventors: Wei Liang, Liaoning (CN); Haibin Yu, Liaoning (CN); Chaofan Ma, Liaoning (CN); Xiaoling Zhang, Liaoning (CN)

(73) Assignee: SHENYANG INSTITUTE OF AUTOMATION, CHINESE ACADEMY OF SCIENCES, Shenyang, Liaoning (CN)

(*) Notice: Subject to any disclaimer, the term of this patent is extended or adjusted under 35 U.S.C. 154(b) by 78 days.

(21) Appl. No.: 15/527,244

(22) PCT Filed: Dec. 11, 2014

(86) PCT No.: PCT/CN2014/093573
§ 371 (c)(1),
(2) Date: May 16, 2017

(87) PCT Pub. No.: WO2016/082254
PCT Pub. Date: Jun. 2, 2016

(65) Prior Publication Data
US 2017/0339572 A1    Nov. 23, 2017

(30) Foreign Application Priority Data
Nov. 27, 2014 (CN) .......................... 2014 1 0705060

(51) Int. Cl.
*H04W 16/20* (2009.01)
*G01S 5/02* (2010.01)
*H04W 16/18* (2009.01)

(52) U.S. Cl.
CPC ........... *H04W 16/20* (2013.01); *G01S 5/0252* (2013.01); *H04W 16/18* (2013.01); *G01S 5/0278* (2013.01)

(58) Field of Classification Search
CPC ... H04W 84/047; H04W 84/18; H04W 24/02; H04W 4/38
(Continued)

(56) References Cited

U.S. PATENT DOCUMENTS

| | | | |
|---|---|---|---|
| 2009/0207769 A1* | 8/2009 | Park | H04W 74/04 370/311 |
| 2012/0169491 A1 | 7/2012 | Chang et al. | |
| 2013/0079030 A1 | 3/2013 | Kang et al. | |

FOREIGN PATENT DOCUMENTS

| | | |
|---|---|---|
| CN | 101437305 A | 5/2009 |
| CN | 101489275 A | 7/2009 |
| CN | 101570956 A | 11/2009 |
| CN | 102098691 A | 6/2011 |
| CN | 103716803 A | 4/2014 |

OTHER PUBLICATIONS

Chinese Search Report dated Jun. 21, 2018 for CN Application No. 201410705060.3 (1 page).
(Continued)

*Primary Examiner* — Sam Bhattacharya
(74) *Attorney, Agent, or Firm* — Smith, Gambrell & Russell, LLP

(57) ABSTRACT

The present invention relates to a robust coverage method for relay nodes in a double-layer structure wireless sensor network. The present invention is a local search based relay node 2-coverage deployment algorithm which, by means of reducing the global deployment problem to a local deployment problem, achieves optimal deployment while ensuring robustness. The method specifically comprises two steps: first 1-coverage and second 1-coverage, wherein the first 1-coverage comprises the three steps of construction of relay node candidate deployment locations, grouping of sensor
(Continued)

nodes and local deployment of relay nodes, wherein the sensor nodes are grouped by means of a novel grouping method, and the complexity of the algorithm is reduced while ensuring optimal deployment. The second 1-coverage adjusts a threshold, selects from every group the sensor nodes covered by just one relay node, and uses a 1-coverage method to re-implement 1-coverage of the sensor nodes, thereby ensuring robustness, reducing the number of relay nodes deployed, and shortening the problem-saving time.

6 Claims, 4 Drawing Sheets

(58) Field of Classification Search
USPC .................. 455/446, 450; 370/256, 311, 400
See application file for complete search history.

(56) References Cited

OTHER PUBLICATIONS

First Chinese Office Action dated Jul. 4, 2018 for CN Application No. 201410705060.3 (4 pages in Chinese, and English Translation).

Second Chinese Office Action dated Aug. 30, 2018 for CN Application No. 201410705060,3 (4 pages in Chinese, and English Translation).
International Search Report dated Jul. 29, 2015 for International Patent Application No. PCT/CN2014/093573 (3 pages in Chinese, and English translation).
Written Opinion of the International Searching Authority dated Jul. 29, 2015 for International Patent Application No. PCT/CN2014/093573 (3 pages on Chinese, and English translation).
International Preliminary, Report on Patentability dated May 30, 2017 for International Patent Application No. PCT/CN2014/093573 (4 pages in Chinese, and English translation).
Supplementary European Search Report for EP Patent Application No. 14906877.7 dated Apr. 24, 2018 (4 pages).
Shah, Babar, et al. 'A Guaranteed Lifetime Protocol for Real-Time Wireless Sensor Networks,' 2014 IEEE 28th International Conference on Advanced Information Networking and Applications, IEEE. 2014. pp. 421-428.
Wu, Jieyu, et al. 'Relay Node Deployment Based Small World Effect in Hierarchical Industrial Wireless Sensor Networks,' 2013 IEEE International Conference on Green Computing and Communications and IEEE Internet of Things and IEEE Cyber, Physical and Social Computing, IEEE. 2013. pp. 1066-1071.

* cited by examiner

ROBUST COVERAGE METHOD FOR RELAY NODES IN DOUBLE-LAYER STRUCTURE WIRELESS SENSOR NETWORK

TECHNICAL FIELD

The present invention relates to wireless sensor network technologies, and in particular to a robust coverage method for relay nodes in a double-layer structure wireless sensor network.

BACKGROUND

A wireless sensor network consists of sensor nodes with low cost and low energy consumption and can complete information perception, simple data processing, short-distance communication and other functions. The wireless sensor network is always a research hotspot due to the enormous application potential in aspects of battlefield surveillance, environment monitoring, industrial automation, agricultural production, etc. However, the sensor nodes are generally powered by a battery which is difficult to replace once deployed, causing a limitation to the life of the wireless sensor network. With respect to the problem of prolonging the life of the network, a double-layer wireless sensor network structure is proposed in the prior art. A small quantity of relay nodes with adequate energy and large communication radius are deployed in the double-layer structure network, and act as cluster heads. 1-hop neighbor sensor nodes send collected data to the relay nodes, and the relay nodes collect the data collected by the 1-hop neighbor sensor nodes and forward the data to convergent nodes. In the double-layer structure wireless sensor network, the sensor nodes can forward the collected information in an energy saving mode. Apparently, the relay nodes are of great importance in the double-layer structure wireless sensor network. However, the relay nodes have high cost. How to reduce the deployment cost of the relay nodes (reduce the number of the relay nodes) on the premise of ensuring network coverage and connectivity becomes a current research hotspot.

The existing deployment method with respect to the relay nodes comprises two phases: a geometric unit circle coverage phase and a network connectivity construction phase, wherein a geometric unit circle coverage algorithm mainly comprises a division-motion based manner, a grid based manner and a set coverage based manner. The algorithm complexity of the division-motion based manner has an exponential growth trend along with a division-motion factor; and for the algorithms of the grid based manner and the set coverage based manner, a final result is that more relay nodes are deployed. In general, the current geometric unit circle coverage algorithm has higher calculation complexity and higher deployment cost.

Although the design process of the wireless sensor network is limited by a cost factor, the network robustness remains a crucial problem in the design of the wireless sensor network. Therefore, a conventional method is to adopt the strategy of implementing 2-coverage on the sensor nodes, i.e., each sensor node is covered by at least two relay nodes. Traditionally, 2-coverage is designed on the basis of 1-coverage. For the sensor nodes covered by less than two relay nodes, only a 1-coverage algorithm is used for re-implementing simple coverage.

SUMMARY

In view of the problems of poor robustness, poor optimality, etc. caused by a lack of comprehensive consideration of the deployment number of relay nodes, network load balance and network robustness in the design process of a 2-coverage algorithm of a wireless sensor network, the present invention proposes a robust coverage method for relay nodes in a double-layer structure wireless sensor network.

To realize the above-mentioned purposes, the present invention discloses the technical solution: A robust coverage method for relay nodes in a double-layer structure wireless sensor network comprises the following steps:

first 1-coverage: comprising a construction phase of relay node candidate locations, a grouping phase of sensor nodes and a local deployment phase; the construction phase of the relay node candidate locations is used for constructing the candidate deployment directions of all the relay nodes according to the direction information of the sensor nodes to be covered; the grouping phase of the sensor nodes is used for dividing the sensor nodes to be covered into independent groups; the local deployment phase is used for deploying the relay nodes in various independent groups, and the final deployment of the relay nodes is formed by local deployment results of various groups;

second 1-coverage: implementing second 1-coverage on the sensor nodes covered by just one relay node in a first 1-coverage result;

merging a second 1-coverage result and the first 1-coverage result; and outputting a final merged result.

The construction phase of the relay node candidate locations comprises the following steps:

(1) inputting location information $X=\{x_1, x_2, \ldots, x_n\}$ of n sensor nodes to be covered;

(2) starting from 1 for i to mark $x_i$ as a searched node to construct a circle using the physical location of the $x_i$ node as a center of the circle and using a communication radius r as a radius, taking a point on the circumference every $$\frac{2\pi}{k}$$

radian, with a total of k points $Y=\{y_1, y_2, \ldots, y_k\}$ taken on one circumference;

(3) from the $y_1$ point, successively searching sensor nodes covered by the circles using the physical location of the $y_j$ point (j=1, 2 . . . k) as a center of the circle and using a communication radius r as a radius clockwise or anticlockwise;

(4) taking the points which at least cover two sensor nodes from step (3) as relay node candidate locations, and marking the locations as a set $P=\{p_1, p_2, \ldots, p_m\}$;

(5) marking the $(i+1)_{th}$ sensor node from X as the searched node, repeating steps (2)-(4), storing the candidate locations $P=P \cup P_i$ searched each time until all sensor nodes in X are marked as the searched nodes, and outputting a search result P.

In the step (4), if k points cover just one sensor node, the point $$\arg\min_{1 \leq i \leq k} \|p_i - B\|$$

closest to a base station is selected as the relay node candidate location $P_i$, wherein $p_i$ indicates a coordinate of $y_i$ and B indicates a coordinate of the base station.

The grouping phase of the sensor nodes comprises the following steps:

(1) selecting the location $P_i$ from the set P of the relay node candidate locations: $P_i$ covers the most uncovered sensor nodes $$\arg\max_{1 \leq i \leq m} |P_i \cap Z|,$$

wherein m indicates the number of elements in the set P and Z indicates the set of the remaining sensor nodes; marking the set formed by all the sensor nodes covered by $P_i$ as $S_i$;

(2) marking the set of the relay node candidate locations, in P, which cover the sensor nodes in $S_i$ as $N_i$, calling the set formed by the sensor nodes covered by $N_i$ as $T_i$ and collectively calling all the sensor nodes in the set $S_i$ and the set $T_i$ as a group $G_i$ belonging to the location $P_i$;

(3) repeating steps (1)-(2), storing each grouping information $G=G \cup G_i$ until all the sensor nodes are distributed to a certain group, and outputting a grouping result G.

The local deployment phase comprises the following steps:

(1) successively selecting the groups $G_i$ belonging to the location $P_i$ from G and searching all the relay node candidate locations $F_i$ that cover the sensor nodes in $G_i$ from P, thereby converting a geometric disc coverage problem into a minimum set coverage problem;

(2) searching a minimum set coverage $MSC_i$ of $(G_i-S_i)$ from $F_i$ by using a greedy algorithm and defining the weight of $P_i$ as $w_i=|C|$, wherein C is the relay node candidate location uncovered by $MSC_i$ in $N_i$; if $w_i>0$, then selecting $MSC_i$ and $P_i$ as local deployment results; if $w_i=0$ and $P_i$ contains sensor nodes only covered by $P_i$, then selecting $MSC_i$ and $P_i$ as local deployment results; if $w_i=0$ and $P_i$ contains the sensor nodes uncovered by $P_i$, then selecting $MSC_i$ as a local deployment result; recording this local search result as $Y_i$;

(3) repeating steps (1)-(2), searching $G_{i+1}$, storing the minimum set coverage of each group, i.e., $Y=Y \cup Y_i$ until the sensor nodes in each group are covered, and outputting a final search result Y.

The second 1-coverage phase comprises the following steps:

(1) selecting the sensor nodes $X'=\{x'_1, x'_2, \ldots, x'_l\}$, $1 \leq l \leq n$ covered by just one relay node from the first 1-coverage result;

(2) according to the network performance requirement of the wireless sensor network applied to different occasions, manually adjusting the threshold H of the relay node to obtain $$\max_{1 \leq i \leq m} |P_i| \leq H,$$

wherein m is the total number of the relay node candidate locations outputted in the construction phase of the relay node candidate locations and the threshold H is an upper limit of the number of the sensor nodes covered by one relay node;

(3) implementing 1-coverage on the sensor nodes selected in step (1) by using a local search method LSAA of 1-coverage, so that all the sensor nodes are covered by at least two relay nodes;

(4) merging this coverage result D and the first 1-coverage result, i.e., $T=Y \cup D$ and outputting a final merged result T.

The robust coverage method for the relay nodes in the double-layer structure wireless sensor network proposed in the present invention is provided on the premise of fully considering the application particularity of the double-layer structure wireless sensor network. The method can effectively reduce the deployment cost of the relay nodes and ensure required network performance of load balance, robustness, etc., specifically:

1. In the present invention, on the basis of considering the deployment number of the relay nodes, the network load balance and the network robustness, firstly, the nodes are grouped, the global coverage problem is reduced to a local coverage problem, and the problem-solving complexity is reduced; then first 1-coverage is implemented; second 1-coverage is used for each group; after the threshold of the algorithm is adjusted, the 1-coverage algorithm is used for coverage, thereby achieving the optimal deployment of the relay nodes whilst ensuring the coverage robustness.

2. In the first 1-coverage proposed in the present invention, the sensor nodes to be covered are divided into different independent groups and the deployment problem is reduced from global to local, thereby effectively reducing the deployment number of the relay nodes and shortening the solving time of the method.

3. In the second 1-coverage proposed in the present invention, with respect to each group, the thresholds of the relay nodes are adjusted and the characteristics of the deployment number of the relay nodes, the network load balance, the robustness, etc. are changed, thereby effectively improving the network performance.

DETAILED DESCRIPTION

The present invention will be further described in details below in combination with the drawings and the embodiments.

In the robust coverage method for the relay nodes in the double-layer structure wireless sensor network proposed in the present invention, the main concept is as follows: on the basis of considering the deployment number of the relay nodes, the network load balance and the network robustness, the sensor nodes to be covered are divided into different independent groups, so as to implement first 1-coverage; then, with respect to each group, after the threshold of the algorithm is adjusted, the 1-coverage algorithm is used herein for coverage, so as to ensure that the wireless sensor network satisfies the requirements for the network performance of the deployment number of the relay nodes, the load balance, the robustness, etc.

Figure 1:
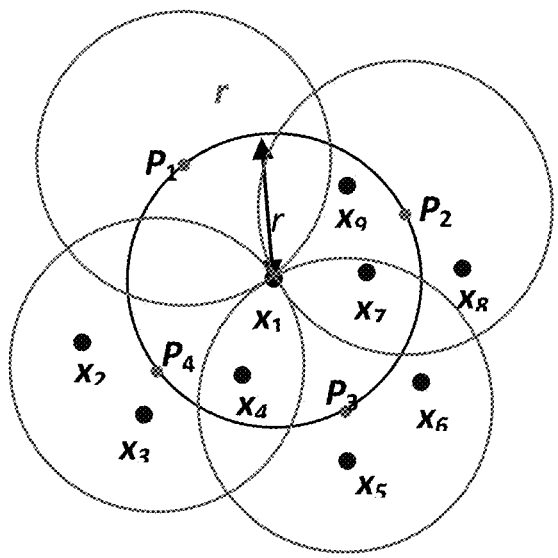
FIG. 1 is a schematic diagram of construction of relay node candidate locations.
Figure 2:
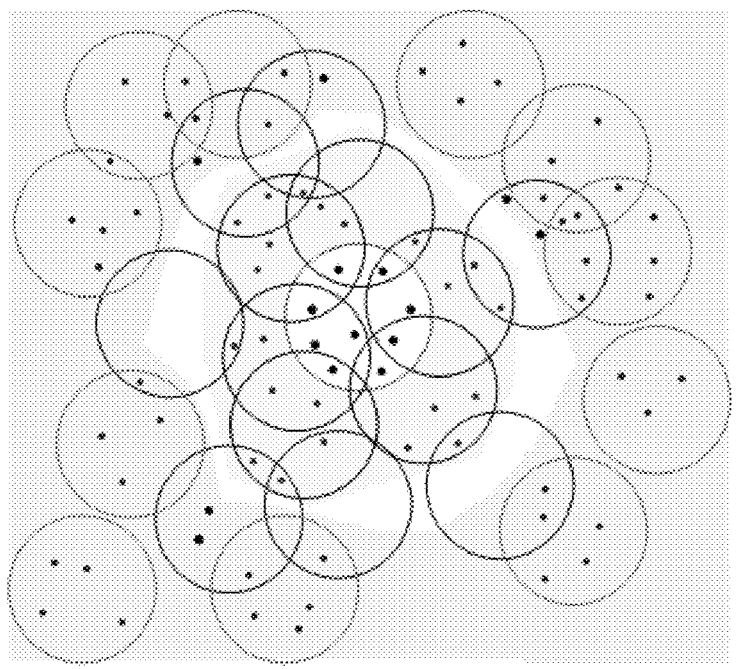
FIG. 2 is a schematic diagram of grouping of sensor nodes.

The method of the present invention comprises two steps: first 1-coverage and second 1-coverage, wherein the step (1) of first 1-coverage comprises a construction phase of relay node candidate deployment locations, a grouping phase of sensor nodes and a local deployment phase, and specifically comprises the following steps:

(1.1) the construction phase of the relay node candidate deployment locations is shown in FIG. 1;

(1.1.1) inputting location information $X=\{x_1, x_2, x_3, x_4, x_5, x_6, x_7, x_8, x_9\}$ of sensor nodes to be covered;

(1.1.2) marking the sensor node $x_1$ as a searched node;

(1.1.3) constructing a circle using $x_1$ as a center of the circle and using a communication radius r as a radius, taking four points uniformly on the circumference of the circle, successively searching sensor nodes covered by the four points, taking the points which at least cover two sensor nodes as relay node candidate locations, and selecting a point closest to a base station as a relay node candidate location if the four points only cover one sensor node, wherein the candidate locations on $x_1$ are respectively $P2=\{x_1, x_7, x_8, x_9\}$, $P3=\{x_1, x_4, x_5, x_6, x_7\}$ and $P2=\{x_1, x_2, x_3, x_4\}$;

(1.1.4) repeating steps (1.1.2)-(1.1.3) until $X=\{x_1, x_2, x_3, x_4, x_5, x_6, x_7, x_8, x_9\}$ are fully marked as the searched nodes;

(1.2) The grouping phase of the sensor nodes is shown in FIG. 2:

(1.2.1) selecting the location $P_i$ from the relay node candidate locations: the location covers the most uncovered sensor nodes, calling the set formed by all the sensor nodes covered by the location $P_i$ as $S_i$, and green circles in FIG. 2 being the coverage range of $P_i$, wherein black points in the green circles are $S_i$;

(1.2.2) marking the set of the relay node candidate locations, in P, which cover the sensor nodes in $S_i$ as $N_i$, calling the set formed by the sensor nodes covered by $N_i$ as $T_i$ and collectively calling all the sensor nodes in the set $S_i$ and the set $T_i$ as a group $G_i$ belonging to the location $P_i$; black circles in FIG. 2 being $N_i$, wherein red points are $T_i$ and the black points and the red points jointly form a group $G_i$;

(1.2.3) repeating steps (1.2.1)-(1.2.2) until all the sensor nodes are distributed to a certain group.

Figure 3:
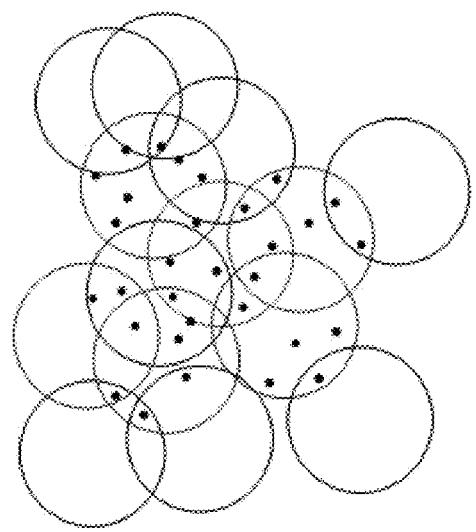
FIG. 3 is a schematic diagram of local deployment of relay nodes.

(1.3) The grouping phase of local deployment is shown in FIG. 3:

(1.3.1) successively (starting from 1) selecting the groups $G_i$ belonging to the location $P_i$ from G and searching all the relay node candidate locations $F_i$ that cover the sensor nodes in $G_i$ from P, thereby converting a geometric disc coverage (GDC) problem into a minimum set coverage (MSC) problem;

(1.3.2) searching a minimum set coverage $MSC_i$ of $(G_i-S_i)$ from $F_i$ by using a greedy algorithm and defining the weight of $P_i$ as $w_i=|C|$, wherein C is the relay node candidate location uncovered by $MSC_i$ in $N_i$; if $w_i>0$, then selecting $MSC_i$ and $P_i$ as local deployment results; if $w_i=0$ and $P_i$ contains sensor nodes only covered by $P_i$, then selecting $MSC_i$ and $P_i$ as local deployment results; if $w_i=0$ and $P_i$ contains the sensor nodes uncovered by $P_i$, then selecting $MSC_i$ as a local deployment result; recording this local search result as $Y_i$; in FIG. 3, green circles are $P_i$, wherein red circles indicate $MSC_i$. It can be seen that one location in $N_i$ is not covered by $MSC_i$, so the weight of the location is: $w_i=1>0$. Therefore, $MSC_i$ and $P_i$ are selected as local deployment results, i.e., the red circles and the green circles are selected as the local deployment results;

(1.3.3) repeating steps (1.3.1)-(1.3.3), searching $G_{i+1}$, storing the minimum set coverage of each group, i.e., $Y=Y \cup Y_i$ until the sensor nodes of each group are covered, and outputting a final search result Y.

Figure 4:
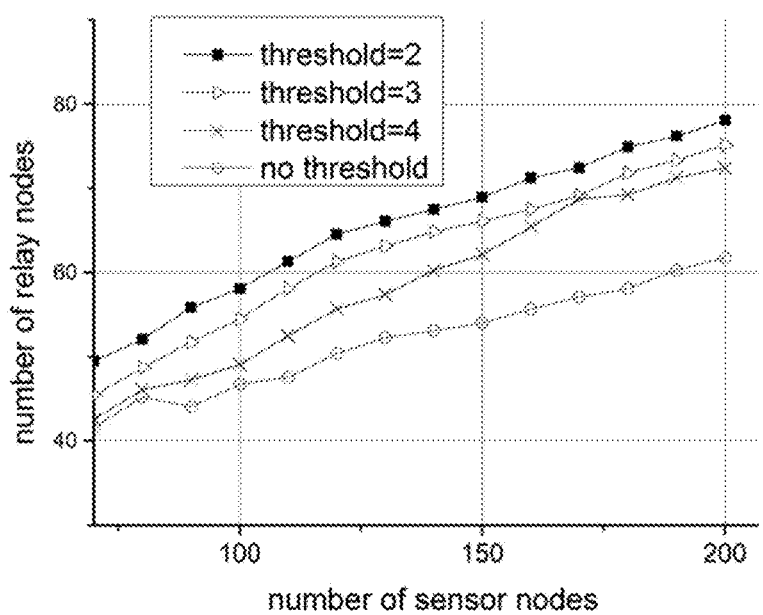
FIG. 4 shows influences of thresholds on deployment number of relay nodes.
Figure 5:
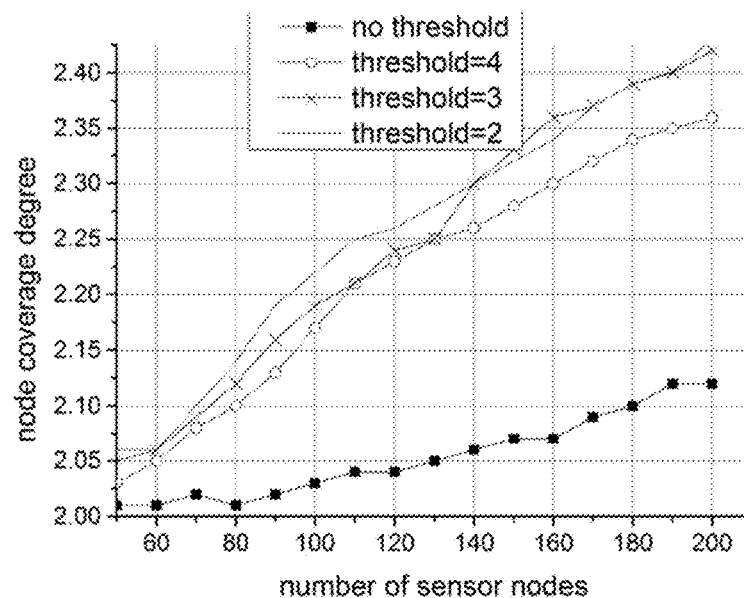
FIG. 5 shows influences of thresholds on covered times of sensor nodes.
Figure 6:
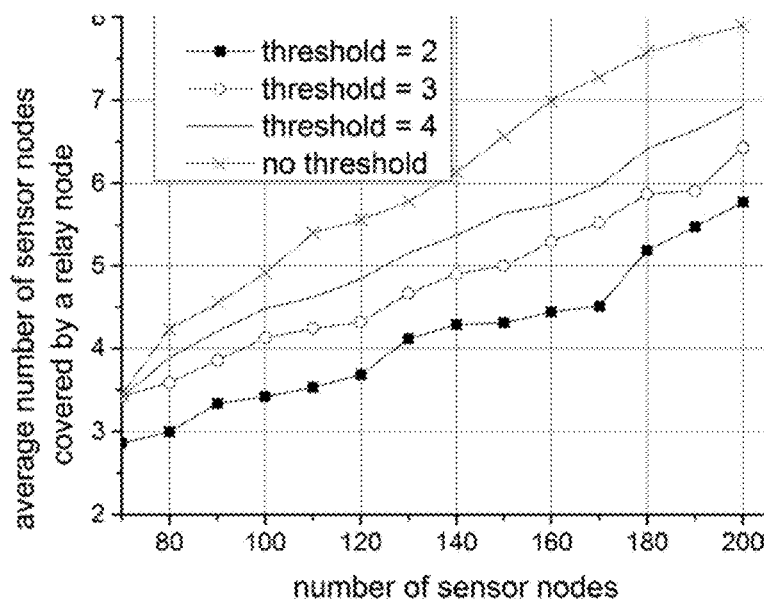
FIG. 6 shows influences of thresholds on sensor nodes covered by relay nodes.

Step (2) of the second 1-coverage phase specifically comprises the following steps:

(2.1) selecting the sensor nodes $X'=\{x'_1, x'_2, \ldots, x'_l\}$, $1 \le l \le n$ covered by just one relay node from the first 1-coverage result;

(2.2) according to the network performance requirement of the wireless sensor network for the deployment number of the relay nodes, the network load balance, the network robustness, etc., manually adjusting the threshold H of the relay node to obtain max $$\max_{1 \le i \le m} |P_i| \le H,$$

wherein m is the total number of the relay node candidate locations; and the threshold represents an upper limit of the number of the sensor nodes covered by each relay node candidate location. FIGS. 4-6 show influences of thresholds on the deployment number of relay nodes, influences of thresholds on the covered times of sensor nodes by the relay nodes and influences of thresholds on the number of sensor nodes covered by relay nodes; the threshold H is adjusted according to the requirement of a specific network environment for the performance, so as to ensure good network performance;

(2.3) implementing 1-coverage on the sensor nodes selected in step (2.1) by using a local search method of the first 1-coverage, so that all the sensor nodes are covered by at least two relay nodes;

(2.4) merging this coverage result D and the first 1-coverage result, i.e., $T=Y \cup D$ and outputting a final merged result T.

Figure 7:
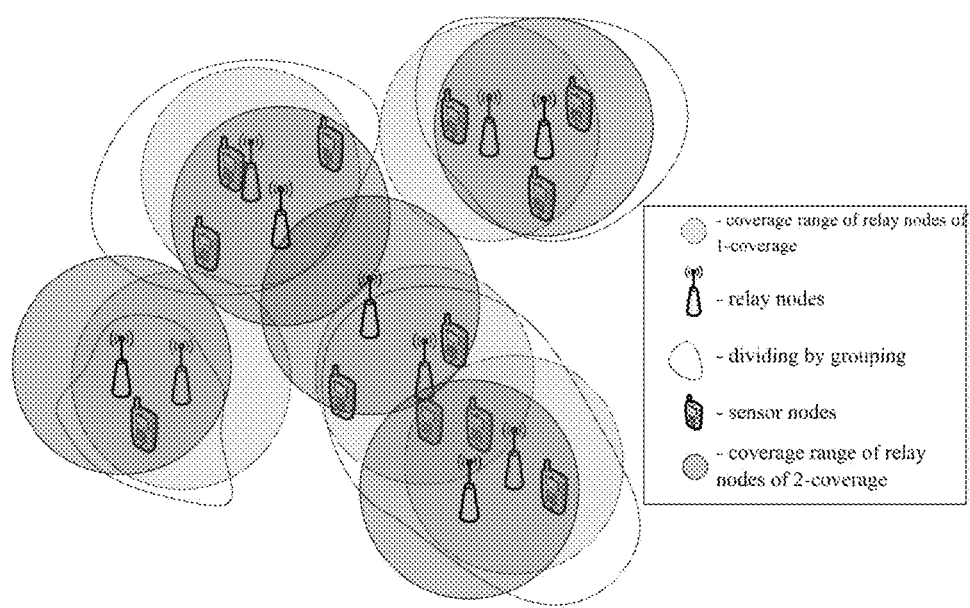
FIG. 7 is a schematic diagram of a final output result.

FIG. 7 is a schematic diagram of a final output result, wherein a blue curve indicates the grouping of the sensor nodes. It can be seen that each sensor node in the groups is covered by at least two relay nodes. Therefore, the influence of the failure of the relay nodes on the entire network is reduced, thereby improving the network robustness, wherein green circles belong to the coverage range of the relay nodes outputted by 1-coverage and red circles belong to the coverage range of the relay nodes outputted by 2-coverage. Meanwhile, the number of the sensor nodes covered by each relay node is not allowed to exceed a set threshold. Therefore, the method proposed in the present invention can further ensure the load balance on the basis of improving the robustness of the wireless sensor network.

The invention claimed is:

1. A robust coverage method for relay nodes in a double-layer structure wireless sensor network, comprising the following steps:

first 1-coverage, comprising:
   a construction phase of relay node candidate locations;
   a grouping phase of sensor nodes; and
   a local deployment phase; wherein
   said construction phase of the relay node candidate locations is used for constructing candidate deployment directions of all the relay nodes according to direction information of the sensor nodes to be covered;
   said grouping phase of the sensor nodes is used for dividing the sensor nodes to be covered into independent groups;

said local deployment phase is used for deploying the relay nodes in various independent groups; and a final deployment of the relay nodes is formed by local deployment results of various groups;

second 1-coverage, comprising: implementing second 1-coverage on sensor nodes covered by just one relay node in a first 1-coverage result;

merging a second 1-coverage result and the first 1-coverage result; and outputting a final merged result.

2. The robust coverage method for the relay nodes in the double-layer structure wireless sensor network according to claim 1, wherein said construction phase of the relay node candidate locations comprises the following steps:

(1) inputting location information $X=\{x_1, x_2, \ldots, x_n\}$ of n sensor nodes to be covered;

(2) starting from 1 for i to mark $x_i$ as a searched node to construct a circle using the physical location of the $x_i$ node as a center of the circle and using a communication radius r as a radius, taking a point on the circumference every $$\frac{2\pi}{k}$$

radian, with a total of k points $Y=\{y_1, y_2, \ldots, y_k\}$ taken on one circumference;

(3) from the $y_1$ point, successively searching sensor nodes covered by the circles using the physical location of the $y_j$ point (j=1, 2 . . . k) as a center of the circle and using a communication radius r as a radius clockwise or anticlockwise;

(4) taking the points which at least cover two sensor nodes from step (3) as relay node candidate locations, and marking the locations as a set $P=\{p_1, p_2, \ldots, p_m\}$;

(5) marking the $(i+1)_{th}$ sensor node from X as the searched node, repeating steps (2)-(4), storing the candidate locations $P=P\cup P_i$ searched each time until all sensor nodes in X are marked as the searched nodes, and outputting a search result P.

3. The robust coverage method for the relay nodes in the double-layer structure wireless sensor network according to claim 2, wherein in said step (4), if k points cover just one sensor node, the point $$\underset{1\leq i\leq k}{\arg\min} \|p_i - B\|$$

closest to a base station is selected as the relay node candidate location $P_i$, wherein $p_i$ indicates a coordinate of $y_i$ and B indicates a coordinate of the base station.

4. The robust coverage method for the relay nodes in the double-layer structure wireless sensor network according to claim 1, wherein said grouping phase of the sensor nodes comprises the following steps:

(1) selecting the location $P_i$ from the set P of the relay node candidate locations: $P_i$ covers the most uncovered sensor nodes $$\underset{1\leq i\leq m}{\arg\max} |P_i \cap Z|,$$

wherein m indicates the number of elements in the set P and Z indicates the set of the remaining sensor nodes; marking the set formed by all the sensor nodes covered by $P_i$ as $S_i$;

(2) marking the set of the relay node candidate locations, in P, which cover the sensor nodes in $S_i$ as $N_i$, calling the set formed by the sensor nodes covered by $N_i$ as $T_i$ and collectively calling all the sensor nodes in the set $S_i$ and the set $T_i$ as a group $G_i$ belonging to the location $P_i$;

(3) repeating steps (1)-(2), storing each grouping information $G=G\cup G_i$ until all the sensor nodes are distributed to a certain group, and outputting a grouping result G.

5. The robust coverage method for the relay nodes in the double-layer structure wireless sensor network according to claim 1, wherein said local deployment phase comprises the following steps:

(1) successively selecting the groups $G_i$ belonging to the location $P_i$ from G and searching all the relay node candidate locations $F_i$ that cover the sensor nodes in $G_i$ from P, thereby converting a geometric disc coverage problem into a minimum set coverage problem;

(2) searching a minimum set coverage $MSC_i$ of $(G_1-S_i)$ from $F_i$ by using a greedy algorithm and defining the weight of $P_i$ as $w_i=|C|$, wherein C is the relay node candidate location uncovered by $MSC_i$ in $N_i$; if $w_i>0$, then selecting $MSC_i$ and $P_i$ as local deployment results; if $w_i=0$ and $P_i$ contains sensor nodes only covered by $P_i$, then selecting $MSC_i$ and $P_i$ as local deployment results; if $w_i=0$ and $P_i$ contains the sensor nodes uncovered by $P_i$, then selecting $MSC_i$ as a local deployment result; recording this local search result as $Y_i$;

(3) repeating steps (1)-(2), searching $G_i+i$, storing the minimum set coverage of each group, i.e., $Y=Y\cup Y_i$ until the sensor nodes in each group are covered, and outputting a final search result Y.

6. The robust coverage method for the relay nodes in the double-layer structure wireless sensor network according to claim 1, wherein said second 1-coverage phase comprises the following steps:

(1) selecting the sensor nodes $X'=\{x'_1, x'_2, \ldots, x'_l\}$, $1\leq l\leq n$ covered by just one relay node from the first 1-coverage result;

(2) according to the network performance requirement of the wireless sensor network applied to different occasions, manually adjusting the threshold H of the relay node to obtain $$\underset{1\leq i\leq m}{\max} |P_i| \leq H,$$

wherein m is the total number of the relay node candidate locations outputted in the construction phase of the relay node candidate locations and the threshold H is an upper limit of the number of the sensor nodes covered by one relay node;

(3) implementing 1-coverage on the sensor nodes selected in step (1) by using a local search method LSAA of 1-coverage, so that all the sensor nodes are covered by at least two relay nodes;

(4) merging this coverage result D and the first 1-coverage result, i.e., $T=Y\cup D$ and outputting a final merged result T.

* * * * *